April 2, 1957  H. F. SILVER  2,787,171
VEHICLE PROPULSION MECHANISM
Original Filed Feb. 27, 1948  6 Sheets-Sheet 5
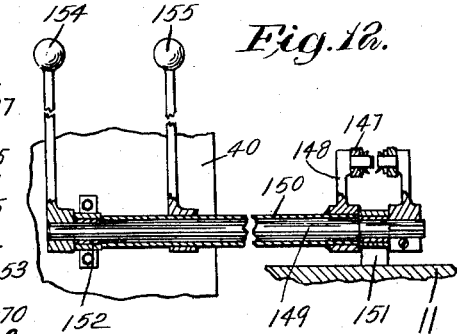
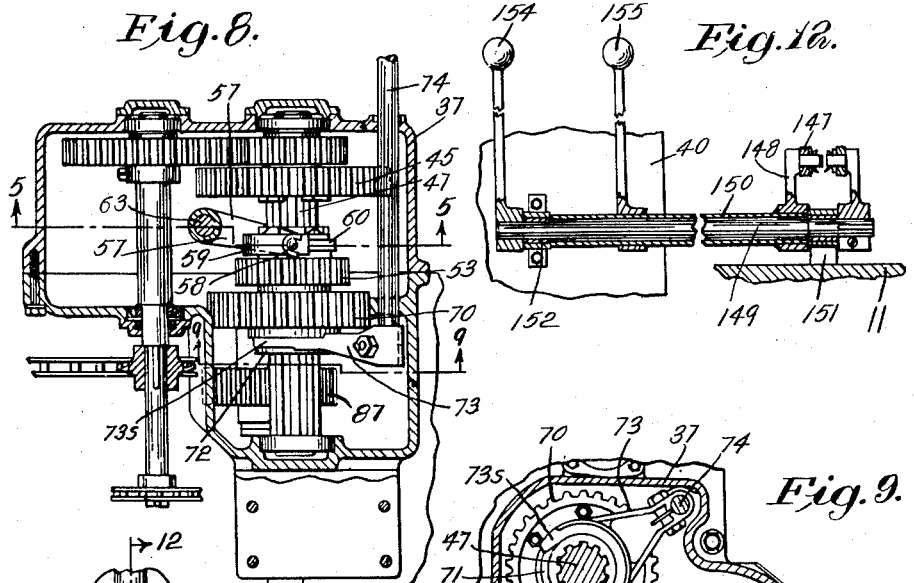
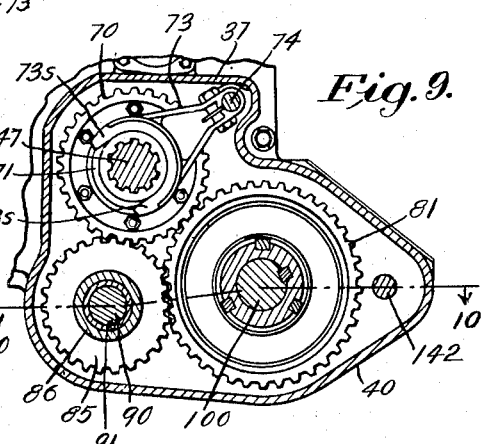
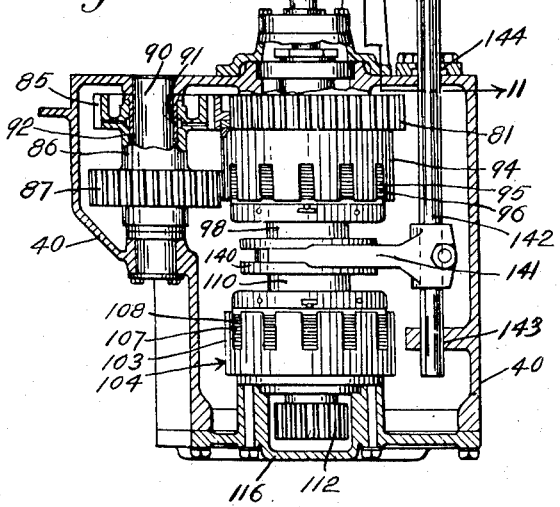
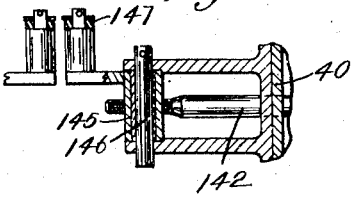
Inventor:
Harold F. Silver.
by Louis A. Maxam
Atty.

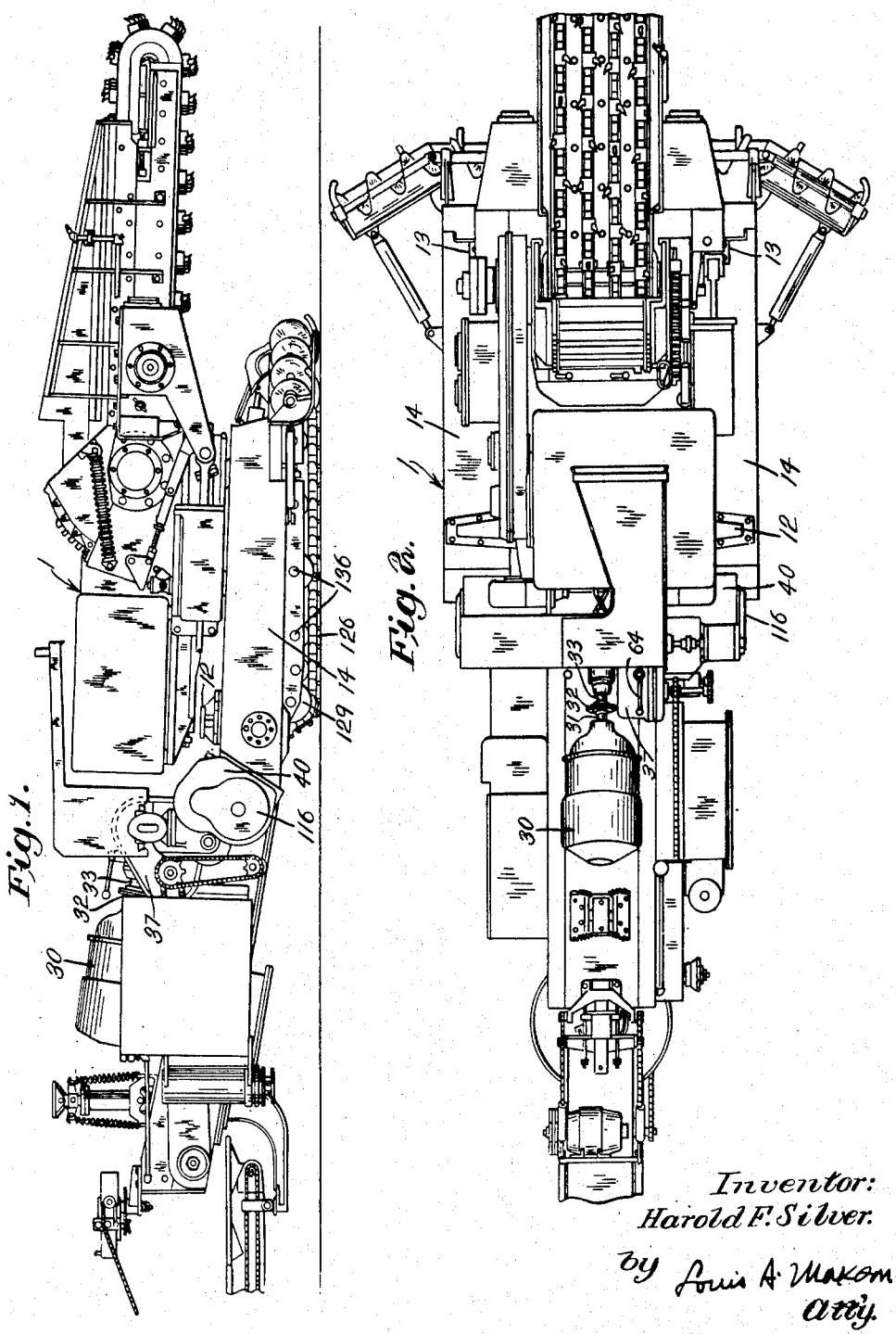

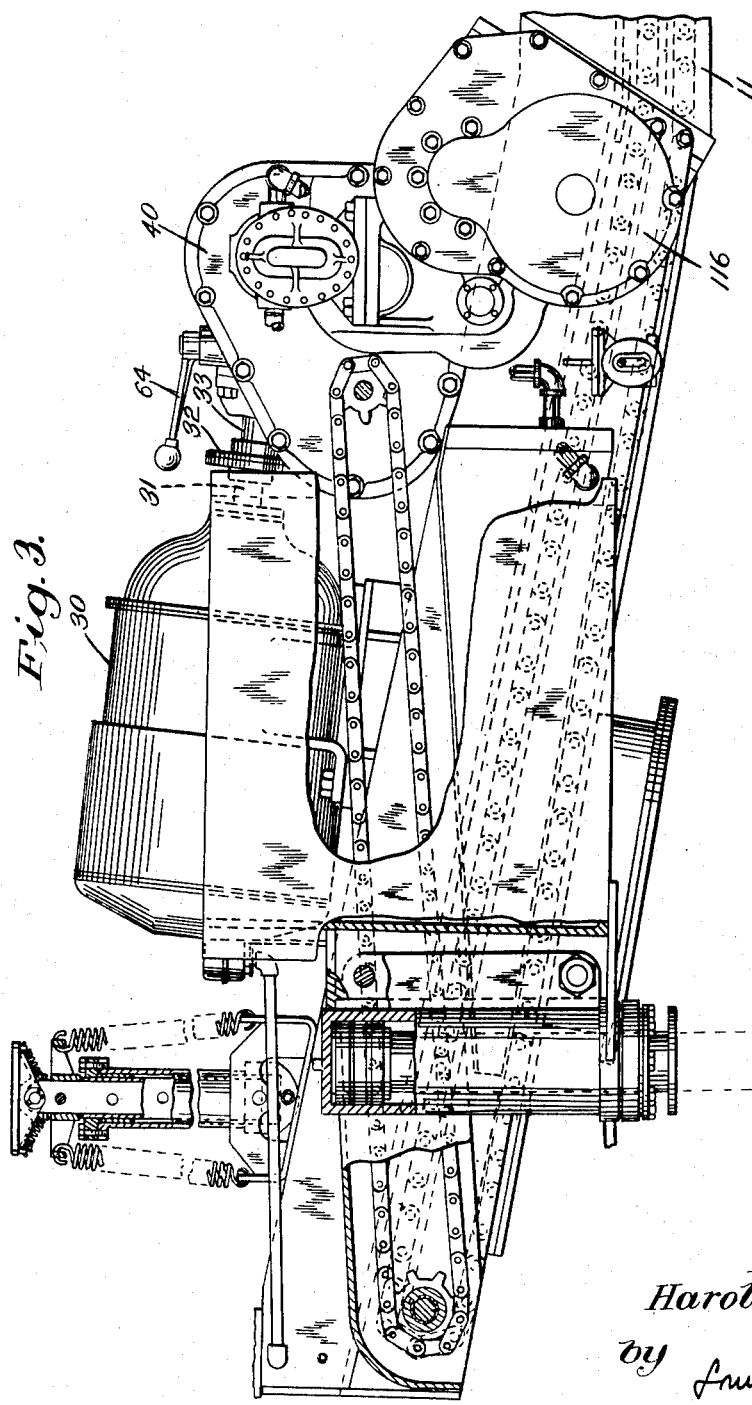

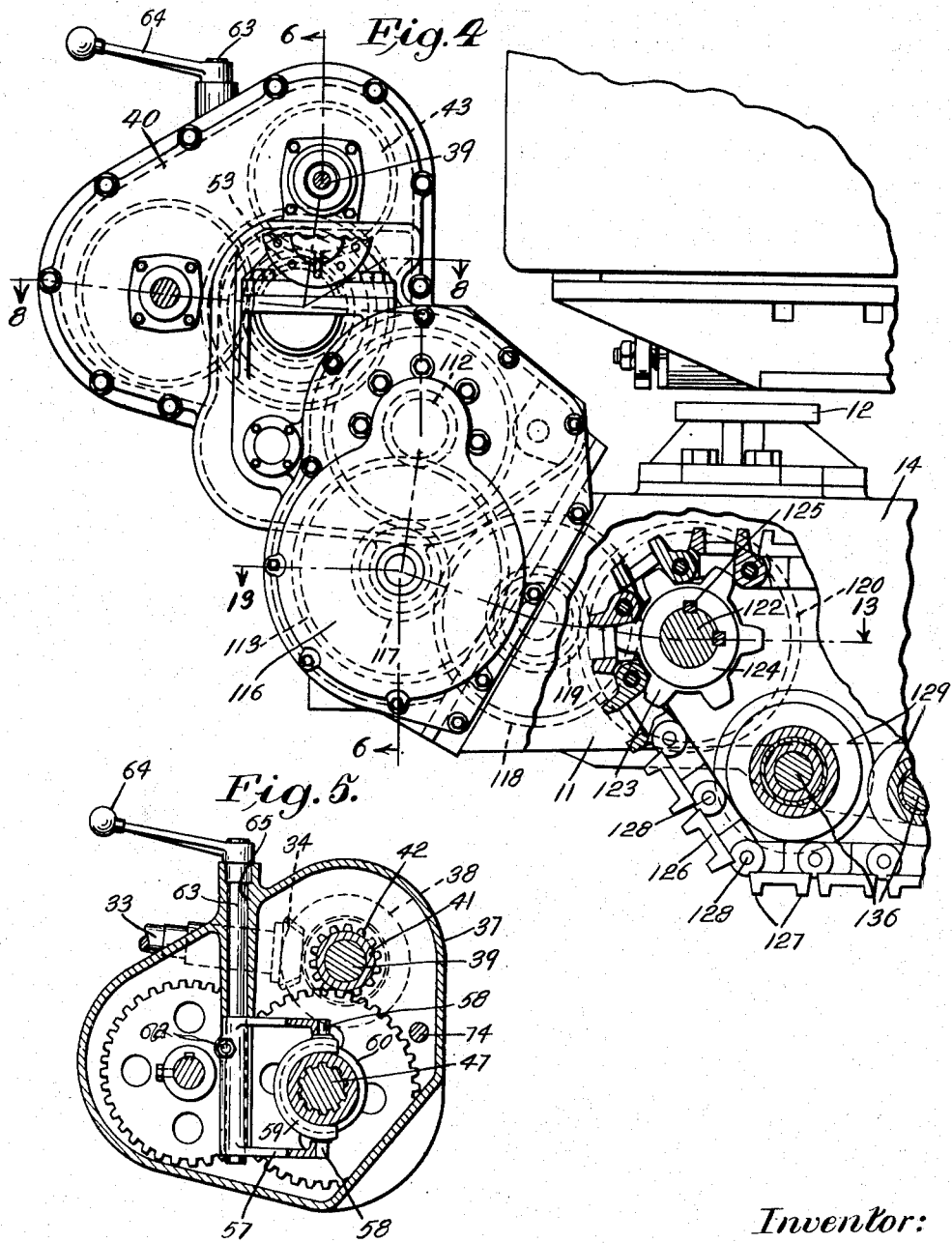

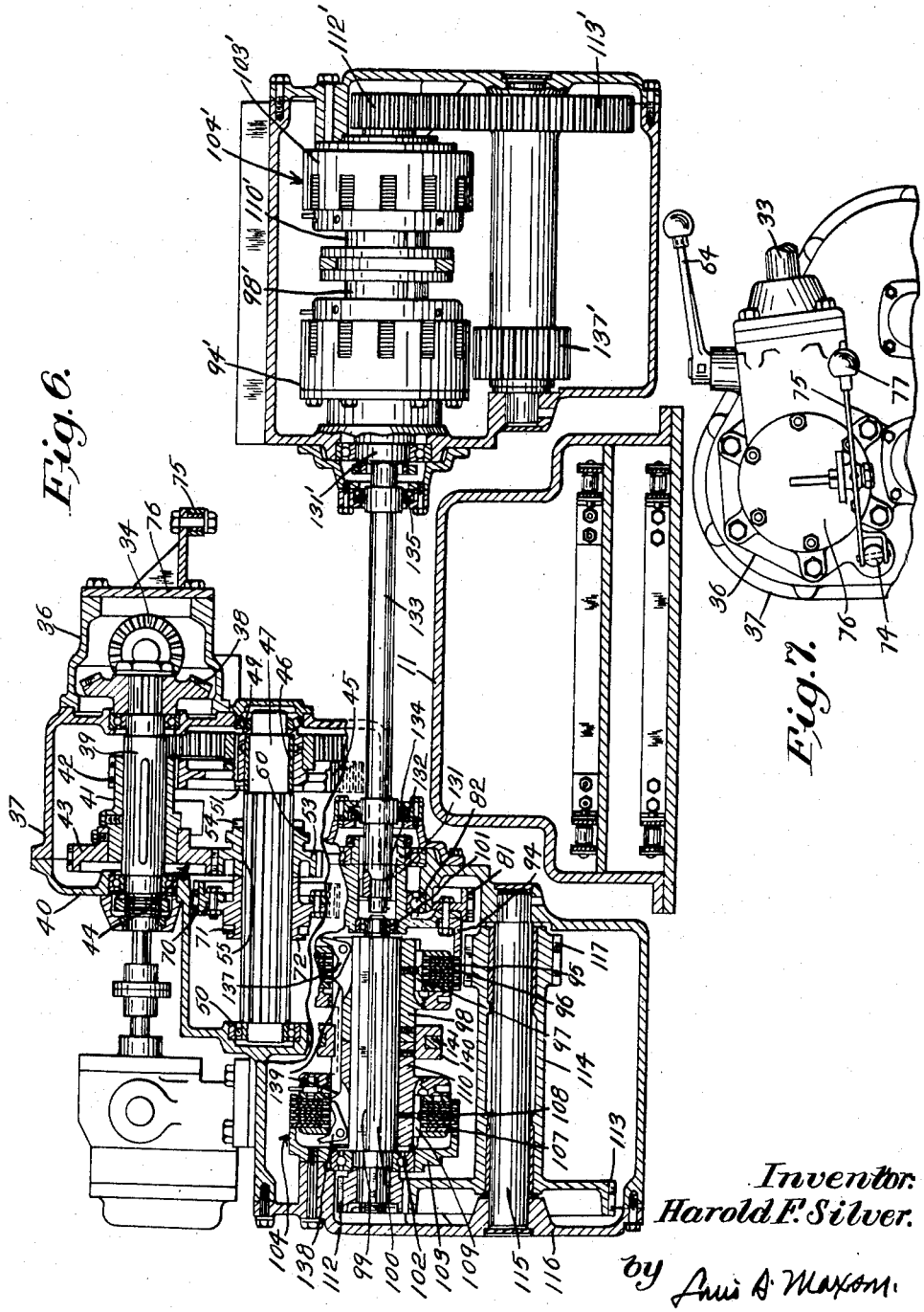

— # United States Patent Office 2,787,171
Patented Apr. 2, 1957

2,787,171

VEHICLE PROPULSION MECHANISM

Harold F. Silver, Denver, Colo., assignor to Joy Manufacturing Company, a corporation of Pennsylvania Original application February 27, 1948, Serial No. 11,688. Divided and this application April 17, 1951, Serial No. 221,474

12 Claims. (Cl. 74—665)

My invention relates to vehicle propulsion apparatus, and especially, but not at all exclusively, to supporting and propulsion apparatus suited to the transport of mining apparatus.

This application is a division of my copending application Serial No. 11,688, filed February 27, 1948; and Serial No. 11,688 is a continuation-in-part of my earlier filed application Serial No. 750,981 filed May 28, 1947, for Apparatus and Method for Mining Coal or Other Minerals from the Solid. The subject matter of this present application is fully disclosed in Serial No. 750,981, now abandoned.

An object of my invention is to provide an improved supporting and propulsion apparatus. Another object is to provide an improved braking and controlling mechanism for a crawler type supporting and propelling mechanism for a vehicle. A further object of the invention is to provide an improved plural speed, reversible crawler drive and support mechanism. Other objects of the invention will hereinafter appear.

In the accompanying drawings, in which one illustrative embodiment of the invention is shown incorporated in a continuous mining apparatus:

Fig. 1 is a side elevational view, with parts broken away, showing a continuous miner in which my improved supporting and propelling apparatus is, in its illustrative embodiment, incorporated.

Fig. 2 is a plan view of the apparatus shown in Fig. 1.

Fig. 3 is an enlarged side elevational view of the rear end of the vehicle of Fig. 1, with parts broken away to show details, and other parts omitted.

Fig. 4 is a further enlarged side elevational, fragmentary view, with parts broken away, to show a portion of the drive for the crawlers or tractor threads.

Fig. 5 is a detail sectional view taken on the plane of the line 5—5 of Fig. 8.

Fig. 6 is a transverse, generally vertical section on the planes of the line 6—6 of Fig. 4, showing the multispeed driving and braking arrangement for the crawlers or tractor treads, etc., parts being omitted.

Fig. 7 is a fragmentary elevational view showing the control for the selective fast and slow speed drive for the crawlers or tractor treads.

Fig. 8 is a generally horizontal section on the planes of the line 8—8 of Fig. 4.

Fig. 9 is a vertical, longitudinal section on the plane of the line 9—9 of Fig. 8.

Fig. 10 is a horizontal section on the plane of the line 10—10 of Fig. 9.

Fig. 11 is a fragmentary vertical section on the plane of the line 11—11 of Fig. 10.

Fig. 12 is a fragmentary vertical sectional view on the plane of the section line 12—12 of Fig. 10.

Figure 13:
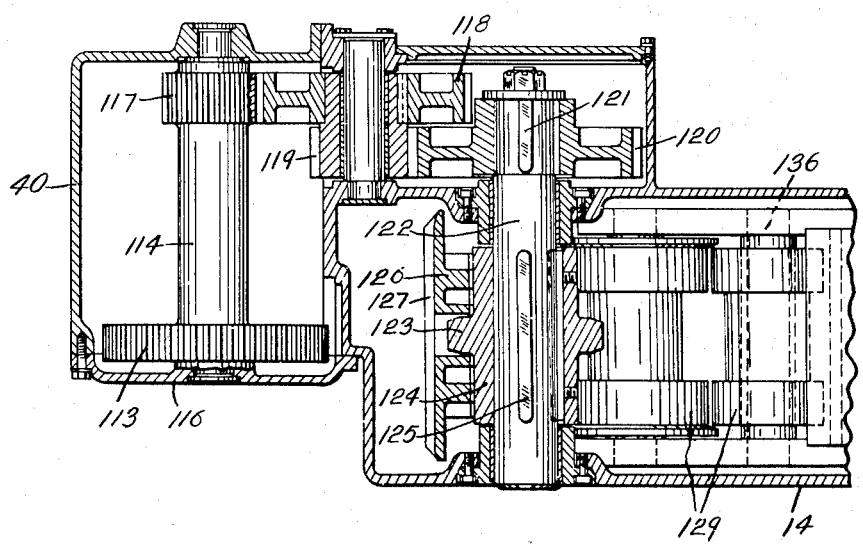
Fig. 13 is a generally horizontal sectional view on the plane of the section line 13—13 of Fig. 4, showing details of the drive for a crawler or tractor tread.

While it is in no sense limited to such use the invention is illustrated as a transport mechanism for a continuous mining apparatus 1. This apparatus 1 has as its transport mechanism a tractor or crawler type truck consisting of a body 11 which is supported by a rear transverse support member 12 and by generally oppositely extending foot members 13, on tractor or crawler frames 14. As the specific nature of the apparatus supported and propelled by the improved transport mechanism is immaterial to the subject matter hereinafter, in this present application, described and claimed, a detailed description of the continuous mining apparatus need not be given.

Power for the actuation of the transport mechanism is derived from a motor 30. The motor 30 has a power shaft 31, connected by a coupling 32 to a shaft 33 which carries, fixed thereto, a bevel drive pinion 34. This bevel drive pinion is suitably journaled in a portion of a gear casing 36 which is mounted on a larger, multipiece gear casing 37. The pinion 34 meshes with and drives a bevel gear 38 keyed to a transverse shaft 39 journaled in the gear casing 37 and in another gear casing element 40. The shaft 39 has keyed to it a sleeve 41 on which there is integrally formed a spur drive pinion 42 and on which there is also carried a larger spur drive gear 43, non-rotatively secured in any suitable manner to the sleeve 41. The drive pinion 42 and the drive gear 43 constitute the drive elements of a low and high speed mechanism 44, and the drive pinion 42 meshes with a gear 45 journaled on a bearing sleeve 46 on a shaft 47 which is journaled, as at 49 and 50, in the gear casing elements 37 and 40. The gear 45 is freely rotatable relative to the shaft 47, but has clutch jaws 51 by means of which, as later described, it may be connected in driving relation with the shaft 47. The larger drive pinion 43 engages a gear member 53, which has clutch jaws 54 formed on it; and these clutch jaws may be engaged with the clutch jaws 51 by sliding the member 53 to the right in Fig. 6. When the gear 53 occupies the position shown in Fig. 6, however, it transmits the rotation which it derives from the driving gear 43 to the shaft 47 through a spline connection 55. It will be noted, therefore, that the shaft 47 will be rotated at a relatively high speed when the gear 53 is in the position shown in Fig. 6, and at a slower speed, through the gear 45, the clutch jaws 51 and 54, and the spline connection 55, when the clutch jaws are engaged with each other and the gear member 53 is disengaged from the driving gear 43. Any suitable means may be provided for shifting the gear 53 from one position to the other, and I have provided a shifter fork 57 engaging trunnions 58 on a shipper member 59 fitted over an annular flange 60 formed on the gear 53; and the fork is secured, as at 62, to a vertical shaft 63 having an operating handle 64 and journaled in a bore 65 in the gear casing portion 37.

That the spline shaft 47 may be driven at two speeds, each in the same direction, has been noted. This shaft 47 is adapted to drive in opposite directions, through drive connections which will now be explained, the tractor or crawler treads which support the apparatus.

The spline shaft 47 (see Fig. 8) has slidably secured to it a driving gear 70, which may be moved by means of a groove 71 in its hub portion 72, longitudinally of the shaft 47. A shipper yoke 73 carried by a transversely extending rod 74 has portions 73S engaging in the groove 71; and the rod 74 can be shifted longitudinally by means of a pivoted lever 75 mounted on the cover 76 of the gear casing portion 36, and having at one end thereof an operating handle 77. The gear 70, in the position shown in Fig. 6, meshes with a gear 81 mounted in bearings 82 supported by the frame portion 40. The gear 81 also meshes with a gear 85 (see Fig. 10) formed on a sleeve 86, which also carries a larger gear 87 of appropriate construction and size to be engaged by the gear 70 when the latter is moved to the left in Fig. 6 from the position shown, and is disengaged from the gear 81. It will thus be seen that the gear 81 is adapted to be driven directly by the gear 70 in a direction opposite to the direction of rotation of the gear 70, and, by the gear 70 through the gear 87, sleeve 86 and pinion 85, which meshes with the gear 81, in the same direction with the gear 70. The sleeve 86 is suitably journaled on a shaft 90 mounted at its opposite ends in the casing element 40 and supporting a bearing element 91 between it and the wall of the bore 92 which extends through the sleeve 86 and the gears 85 and 87.

The gear 81 has bolted to it a sleeve 94 to which there are appropriately fixed a series of inwardly projecting friction clutch discs 95, while with these discs there are interleaved other friction clutch discs 96 connected by splines 97 and notches, not shown in view of the small scale employed, with a sleeve 98 splined as at 99 to a shaft 100 journaled as at 101 in the hub of the gear 81 and at 102 in a member 103 which forms the casing of a braking mechanism generally designated 104. Radially projecting portions formed thereon connect a series of friction discs 107, as shown in Fig. 10, to the brake casing 103, while an intermediate series of discs 108 is connected by splines 109 to a sleeve 110 fixed by the splining 99 against turning relative to the shaft 100. The shaft 100 carries, at its left hand end in Fig. 6, a drive pinion 112, which meshes with a gear 113 formed on a sleeve 114, journaled on a shaft 115 supported in the wall of the casing element 40 and in a cover plate 116 associated with the housing. The sleeve 114 carries a drive pinion 117 which actuates, through a speed reduction gearing including a large gear 118 and a coaxial small pinion 119 fixed to the gear 118, and a large gear 120 keyed as at 121 to a transverse shaft 122, a tractor or crawler tread drive sprocket 123 having a sleeve portion 124 which is splined at 125 to the shaft 122 for rotation with the latter. The tractor or crawler tread drive sprocket 123 drives a flexible tractor or crawler tread 126 made up of a plurality of ground-engaging elements 127 pivotally connected at 128 and supported by rollers 129 journaled on non-rotating shafts 136 which are secured in the walls of the tractor or crawler frames 14.

So far, the drive and braking provisions for the crawler or tractor tread at the right hand side of the machine, (looking forward) have been described, but it will be understood, of course, that at the left hand side of the machine there is an essentially duplicate crawler or tractor tread with corresponding braking and driving means, the parts of which are indicated, to the extent to which they are visible and have seemed to warrant marking, by primed numbers corresponding to the numbers used in the detailed explanation of the mechanism at the right hand side of the machine. The plural speed drive mechanism and the reversing mechanism at the right hand side of the machine are not duplicated at the left hand side of the machine (looking forward) but instead the hub portion 131 of the gear 81 has a splined driving connection at 132 with a transversely extending shaft 133, which extends through seals 134 and 135 respectively at the right and left hand sides of the machine frame (looking forward) and which has a splined connection corresponding to the splined connection at the right hand side of the machine, with the sleeve 131' secured to the clutch housing 94'.

The sleeves 98 and 110 carry pivoted shipper elements 137 and 138 respectively, which are adapted to be moved to effect the application of pressure to the clutch and brake discs by means of reciprocable wedge elements 139 engaged and movable by a grooved collar 140. With this collar a shipper yoke 141 cooperates, the yoke 141 being carried on a rod 142 suitably guided, as at 143 and 144, in the frame or casing element 40. The rod 142 is movable by a bell crank 145 pivoted at 146 on a vertical pivot stationary with respect to the casing element 40; the arm of the bell crank coacting with the rod 142 having an adjustable connection therewith, as illustrated in Fig. 10, and the other arm of the bell crank being connected by a link 147 with an arm 148 on the outer one, 150, of a pair of coaxial shafts 149, 150, shown in Fig. 12. The shaft 149 is journaled near its end in a bracket 151 secured to the body 11. The shipper mechanism for the clutch and brake mechanisms at the left hand side of the machine (looking forward) are similar to but reversely arranged as compared with those at the right hand side, and the corresponding but reversed bell crank associated with the mechanism at the left hand side of the machine is similarly operated through the center shaft 149 within shaft 150. The shaft 149 also has a bearing bracket 152 supported on the frame 40; and the shafts 149 and 150 have operator controllable levers 154 and 155 respectively.

The mode of operation of the illustrative embodiment hereinabove described will be clear, and so only a résumé will be presented.

It will be evident that the flexible tractor or crawler treads may be controlled independently of each other by the levers 154 and 155, the latter controlling the tread which is at the right hand side of the vehicle, looking forwardly. Either tread can be connected for drive by its associate drive clutch (94 or 94') and either may be braked by the associated disc brake mechanism (104 or 104'). Both treads can be braked simultaneously, and they may be driven together. When driven together, and with the drive clutches loaded to the point at which no slippage takes place, the treads will obviously be driven at like rates since the transverse shaft 133 causes the drive clutch sleeves 94 and 94' to turn at equiangular rates. The sleeve 94' being driven by the sleeve 94, and the latter being driven by the gear 81, it will be evident that the treads can be driven in either direction at will—in one direction when the driving gear 70 engages with and drives the gear 81 and in the other direction when the driving gear 70 meshes with and drives the gear 87 and the latter, through the sleeve 86 and the gear 85 drives the gear 81. Noting that the drive gear 70 is supported by the splined shaft 47 and connected with the latter for rotation therewith, and noting that the shaft 47 can be driven in like directions but at quite different speeds when the gear 53 is driven by the gear 43 and when the gear 53 is disconnected from the gear 43 and is clutched to the gear 45, which is in turn driven by the pinion 42 coaxial with the gear 43. It will be appreciated that "high" and "low" speed drives for the treads are possible. Summarizing, under the control of the control lever 64, high or low speed drives can be initiated, under the control of the control lever 75, the direction of drive can be selected. Under the control of the levers 154 and 155 the tread or treads to be driven or braked can be determined and whether braking or drive shall be effected can be determined. It will therefore be evident that I have provided a drive and control mechanism for a vehicle which is simple in construction, has a relatively small number of parts in proportion to its range of control, and which while well suited to use as a propulsion and control device for a continuous miner is of wide utility.

While there is in this application specifically described one form which the invention may assume in practice, it will be understood that this form is shown for purposes of illustration and that the invention may be modified and embodied in various other forms without departing from its spirit or the scope of the appended claims.

What I claim is:

1. In combination, a rotatable motor driven element, a pair of spaced apart transmission gearings disposed one wholly at one side of a vertical plane in which the axis of said rotatable motor driven element lies and the other wholly at the other side of such plane, a driving element through which power may be transmitted to both of said gearings, said driving element disposed wholly at one side of such plane, driving connections between said motor driven element and said driving element, clutch means at the same side of said plane as said driving element for connecting said driving element to the transmission gearing at that side of said plane, clutch means at the other side of said plane for connecting the transmission gearing at said other side of said plane for drive by said driving element, and means including a shaft deriving its driving force wholly from said driving element and having portions at each side of said plane connecting said driving element with said last mentioned clutch means.

2. In combination, a rotatable motor driven element, a pair of spaced apart transmission gearings disposed one wholly at one side of a vertical plane in which the axis of said rotatable motor driven element lies and the other wholly at the other side of such plane, a driving element through which power may be transmitted to both of said gearings, said driving element disposed wholly at one side of such plane, driving connections between said motor driven element and said driving element, said driving connections wholly at that side of said plane at which said driving element is disposed, clutch means at the same side of said plane as said driving element for connecting said driving element to the transmission gearing at that side of said plane, clutch means at the other side of said plane for connecting the transmission gearing at said other side of said plane for drive by said driving element, and means including a shaft deriving its driving force wholly from said driving element and having portions at each side of said plane connecting said driving element with said last mentioned clutch means.

3. In combination, laterally spaced members to be driven, a pair of laterally spaced transmission gearings one operatively connected to one of said members to be driven and the other to the other of said members to be driven, a motor driven element, an element driven by said motor driven element and adapted to constitute a driving element for each of said transmission gearings, said last recited element disposed closely adjacent to, and having for the connection thereof in driving relation to, one of said transmission gearings a releasable clutch, and having connected thereto for driving the other of said transmission gearings an elongated shaft which it rotates when driven, whether or not said clutch is loaded, and, associated with said shaft at the end of the latter away from said clutch, a further clutch for connecting said shaft with the other of said transmission gearings.

4. A combination as set forth in claim 3 in which each transmission gearing has opposite sides and there is associated with each of the clutches a brake for the transmission gearing which is driven through the clutch, said brake disposed between the opposite sides of the transmission gearing with which it is associated.

5. In combination, a support, members to be driven at opposite sides of said support, separate gear housings at the opposite sides of said support, a pair of transmission gearings respectively operatively connected to said members to be driven, said gearings respectively contained within said transmission housings, a motor driven member on said support, a driving connection between said motor driven member and one of said gearings, and an operative driving connection between an element of said one gearing and the other of said gearings for transmitting power to the latter including a power transmission connection extending transversely across said support between said gear housings for effecting such transmission of power, said power transmission connection transmitting power from said element of said one gearing to an element of the other gearing.

6. A combination as set forth in claim 5 wherein each of said transmission gearings includes a horizontal transverse shaft and said shafts are arranged in axial alignment and said power transmission connection comprises a coaxial shaft extending transversely between said aligned shafts.

7. A combination as set forth in claim 6 wherein said gearings each include a clutch mechanism and a brake mechanism arranged in its respective housing in coaxial relation to said horizontal transverse shafts and said coaxial shaft, said clutch and brake mechanisms spaced apart from each other longitudinally of said transverse shafts, whereby each of said horizontal transverse shafts may be either driven or braked, one of said gearings being driven by the other gearing through said coaxial shaft.

8. In combination, laterally spaced apart members to be driven, a drive clutch mechanism associated with each of said members, each drive clutch mechanism including a driving element and a driven element, said driving elements each having radially spaced, coaxial hub portions and other portions constituting driving portions, a connection between said driving elements including a shaft non-rotatively connected to like portions of each of said driving elements, a motor, and gearing driven by the motor and operatively connected independently of said shaft with the driving element of one of said clutch mechanisms to transmit power to the latter from the motor.

9. In combination, laterally spaced apart members to be driven, a drive clutch mechanism associated with each of said members, each drive clutch mechanism including a driving element and a driven element, a motor, gearing driven by said motor and operatively connected with the driving element of one of said clutch mechanisms adjacent the outer periphery thereof to transmit power to the latter from said motor, and a connection between said driving elements including a shaft non-rotatively connected to each of the same adjacent the inner periphery thereof for maintaining their rates of rotation the same, one of said driving elements being driven by the other element through said shaft.

10. In combination, spaced apart members to be driven, a drive clutch mechanism and a brake associated with each of said members, each drive clutch mechanism including a driving element and a driven element coaxial therewith and each brake including elements coaxial with said driving and driven elements but laterally spaced from the latter, a motor, change speed and reversing gearing driven by said motor and operatively connected with the driving element of one of said clutch mechanisms to transmit power to the latter from said motor, and a drive shaft connecting said last mentioned driving element to the other driving element for rotation together and deriving its rotation only through the former, said shaft extending between said spaced apart members, said other driving element being driven by said driving element of said one of said clutch mechanisms through said drive shaft.

11. In combination, members to be driven laterally spaced from each other, a pair of transmission gearings also laterally spaced from each other and each operatively connected in driving relation to a different one of said members to be driven, each of said transmission gearings including a first stage of reduction and a second stage of reduction, said stages of reduction of each of said gearings spaced laterally from each other, driving means associated with each of said transmission gearings driving said first stage of reduction and including friction clutch devices disposed within the overall width established by said first and second stages of reduction, a motor driven element, said friction clutch devices each including a driving element from which torque is transmitted to effect drive, a driving connection between said motor driven element and one of said last recited elements, and a power transmission connection extending between and connecting for simultaneous rotation said last recited elements, one of said driving elements being driven by the other element through said power transmission connection.

12. In combination, members to be driven laterally spaced from each other, a pair of transmission gearings also laterally spaced from each other and each operatively connected in driving relation to a different one of said members to be driven, each of said transmission gearings including a first stage of reduction and a second stage of reduction, said stages of reduction of each of said gearings spaced laterally from each other, driving and braking means associated with each of said transmission gearings driving and braking said first stage of reduction and including friction devices one individual to driving and one to braking, said friction devices disposed within the overall width established by said first and second stages of reduction, a motor driven element, said friction devices individual to driving each including a driving element from which torque is transmitted to effect drive through one of said last mentioned friction devices, a driving connection between said motor driven element and one of said last recited elements, and a power transmission connection extending between and connecting for simultaneous rotation said last recited elements, one of said driving elements being driven by the other element through said power transmission connection.

References Cited in the file of this patent
UNITED STATES PATENTS

| | | |
|---|---|---|
| 1,409,994 | Bement | Mar. 4, 1922 |
| 1,880,666 | Barnes | Oct. 4, 1932 |
| 1,968,419 | Norelius | July 31, 1934 |
| 2,064,262 | Keese | Dec. 15, 1936 |
| 2,074,319 | Baker | Mar. 23, 1937 |
| 2,099,044 | Wilson | Nov. 16, 1937 |
| 2,357,724 | Beltz | Sept. 5, 1944 |
| 2,384,182 | Lewis | Sept. 4, 1945 |
| 2,585,790 | Kelley | Feb. 12, 1952 |